United States Patent
Dekker et al.

[11] Patent Number: 5,765,952
[45] Date of Patent: *Jun. 16, 1998

[54] DYNAMIC GROOVE BEARING WITH V-SHAPED OIL BARRIER GROOVE

[75] Inventors: Jacobus N. Dekker; Patrick C.J. Rikkelman; Willem Potze, all of Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 762,893

[22] Filed: Dec. 10, 1996

[30] Foreign Application Priority Data

Dec. 22, 1995 [EP] European Pat. Off. ............ 95203614

[51] Int. Cl.⁶ ................ F16C 32/06; F16C 33/72
[52] U.S. Cl. ............................... 384/132; 384/107
[58] Field of Search ................... 384/100, 107, 384/114, 119, 120, 132, 133

[56] References Cited

U.S. PATENT DOCUMENTS

| | | | |
|---|---|---|---|
| 5,112,142 | 5/1992 | Titcomb et al. | 384/132 X |
| 5,403,098 | 4/1995 | Yasui et al. | 384/132 X |
| 5,423,612 | 6/1995 | Zang et al. | 384/132 X |
| 5,536,088 | 7/1996 | Cheever et al. | 384/132 X |

FOREIGN PATENT DOCUMENTS 6178492A 6/1994 Japan.

*Primary Examiner*—Thomas R. Hannon
*Attorney, Agent, or Firm*—Leroy Eason

[57] ABSTRACT

A dynamic groove bearing (9,89,111) with an inner bearing part (15) and an outer bearing part (17) which is rotatable about the inner bearing part (15). The bearing parts (15,17) are provided with cooperating bearing surfaces (23,35) between which a bearing gap (45) filled with liquid lubricant (75,105) is present. The bearing surface (35) of at least one of the bearing parts (17) is provided with a pattern of grooves (51,53). The bearing surface (35) of the outer bearing part (17) is provided with an annular recess (67, 91,113) which bounds the bearing gap (45). The annular recess (67, 91, 113) is asymmetrical, having at a side thereof facing the bearing gap (45) a first lateral surface (69) adjoining the bearing surface (35) of the outer bearing part (17) and enclosing an obtuse angle $\beta_1$ with the bearing surface (35) of the outer bearing part (17). At a side remote from the bearing gap (45) the annular recess has a second lateral surface (71) which adjoins the bearing surface (35) of the outer bearing part (17) and encloses an obtuse angle $\beta_2$ with respect thereto, the obtuse angle $\beta_1$ being smaller than the obtuse angle $\beta_2$. The annular recess (67, 91, 113) prevents leakage of the liquid lubricant (75, 105) from the bearing gap (45) at comparatively high speeds of the dynamic groove bearing (9, 89, 111). Such a bearing can be used in an electric motor (1, 87, 109) of a data storage unit (121) in which an information disc (123) such as, for example, a hard disk of a computer, is rotatable relative to a scanning unit (129) with a magnetic head (131) by means of the electric motor.

20 Claims, 4 Drawing Sheets

DYNAMIC GROOVE BEARING WITH V-SHAPED OIL BARRIER GROOVE

BACKGROUND OF THE INVENTION

1. Field of the Invention

The invention relates to a dynamic groove bearing with an inner bearing part and an outer bearing part which is rotatable about the inner bearing part, which bearing parts are provided with cooperating bearing surfaces between which there is a bearing gap in which a liquid lubricant is present during operation, while the bearing surface of at least one of the bearing parts is provided with a pattern of grooves and the bearing surface of the outer bearing part is provided with an annular recess which bounds the bearing gap.

The invention also relates to an outer bearing part suitable for use in a dynamic groove bearing according to the invention.

The invention also relates to an inner bearing part suitable for use in a dynamic groove bearing according to the invention.

The invention further relates to an electric motor with a stator and a rotor which is journaled with rotation possibility relative to the stator by means of a dynamic groove bearing, the stator being fastened to an inner bearing part of the dynamic groove bearing and the rotor to an outer bearing part of the dynamic groove bearing.

The invention also relates to a data storage unit with an information disc and a scanning unit for cooperating with the information disc, said disc being rotatable in a housing by means of an electric motor.

2. Description of the Related Art

A dynamic groove bearing and an electric motor of the kind mentioned in the opening paragraphs are known from JP-A-6-178492. The inner bearing part of the known dynamic groove bearing comprises a fixedly arranged shaft which is provided with a circular-cylindrical bearing surface on which the pattern of grooves is provided. The outer bearing part of the known dynamic groove bearing comprises a bush which is rotatable about the axis and is provided with a smooth circular-cylindrical bearing surface which is to cooperate with the bearing surface of the shaft. A familiar problem in such a dynamic groove bearing is that leakage of liquid lubricant from the bearing gap takes place above a critical speed of the dynamic groove bearing. In the known dynamic groove bearing, an annular recess is provided in the bearing surface of the bush, which recess bounds the bearing gap between the cooperating bearing surfaces of the shaft and the bush. The liquid lubricant leaking from the bearing gap is caught in the annular recess during operation. The liquid lubricant leaked from the bearing gap is held in the annular recess under the influence of a centrifugal force acting on the liquid lubricant as a result of the rotation of the bush around the shaft. Leakage of liquid lubricant from the known dynamic groove bearing is prevented as much as possible in this manner during operation.

A disadvantage of the known dynamic groove bearing is that said annular recess does not prevent leakage of liquid lubricant from the dynamic groove bearing at comparatively high speeds of the bush around the shaft. At such comparatively high speeds of the bush around the shaft, which occur, for example, when the dynamic groove bearing is used in an electric motor for driving a computer hard disk, a comparatively major leakage of liquid lubricant from the bearing gap occurs. As a result, the recess mentioned above becomes entirely filled with liquid lubricant which then spills over the edge of the recess and thus leaks from the dynamic groove bearing.

SUMMARY OF THE INVENTION

It is an object of the invention to provide a dynamic groove bearing of the kind mentioned in the opening paragraph in which leakage of liquid lubricant from the dynamic groove bearing is prevented also at comparatively high speeds of the outer bearing part revolving about the inner bearing part.

The invention is for this purpose characterized in that the annular recess is asymmetrical, having at a side facing the bearing gap with a first lateral surface which adjoins the bearing surface of the outer bearing part and encloses an obtuse angle $\beta_1$ with the bearing surface of the outer bearing part, while the annular recess at a side facing away from the bearing gap is provided with a second lateral surface which adjoins the bearing surface of the outer bearing part and encloses an obtuse angle $\beta_2$ with the bearing surface of the outer bearing part, the obtuse angle $\beta_1$ being smaller than the obtuse angle $\beta_2$. The liquid lubricant leaking from the bearing gap present between the cooperating bearing surfaces during operation is caught therein and retained in the annular recess under the influence of the centrifugal force acting on the liquid lubricant as a result of the rotation of the outer bearing part about the inner bearing part. The liquid lubricant in the annular recess has a meniscus which lies against the first and the second lateral surface of the annular recess at a so-called contact angle. Said contact angle has a value which depends on the composition of the liquid lubricant, the composition of the material of the outer bearing part in which the annular recess is provided, and the speed of the dynamic groove bearing. If the first and the second lateral surface of the annular recess are made from the same material, the contact angle between the liquid lubricant and the first lateral surface will be equal to the contact angle between the liquid lubricant and the second lateral surface. Since the obtuse angle $\beta_1$ of the first lateral surface is smaller than the obtuse angle $\beta_2$ of the second lateral surface, i.e. the first lateral surface is steeper than the second lateral surface, the meniscus will have a level above a bottom of the annular recess adjacent the first lateral surface which is greater than a level of the meniscus above the bottom of the annular recess adjacent the second lateral surface in order to achieve the same contact angle. As a result of this, the meniscus first reaches the bearing surface of the outer bearing part adjacent the first lateral surface at comparatively high speeds, so that the liquid lubricant flows from the annular recess adjacent the first lateral surface and is returned to the bearing gap under the influence of a capillary force of the bearing gap or a pumping action of the pattern of grooves. The meniscus does not reach the bearing surface of the outer bearing part adjacent the second lateral surface of the annular recess, so that the liquid lubricant does not flow from the recess at the side of the annular recess remote from the bearing gap. Leakage of the liquid lubricant from the dynamic groove bearing is thus prevented also at comparatively high speeds of the dynamic groove bearing.

A special embodiment of a dynamic groove bearing according to the invention is characterized in that the obtuse angle $\beta_1$ is smaller than 135°, while the obtuse angle $\beta_2$ is greater than 145°. The use of said values for the angles $\beta_1$ and $\beta_1$ leads to a difference in level between the meniscus adjacent the first lateral surface of the annular recess and the meniscus adjacent the second lateral surface of the annular recess which is sufficient for preventing leakage of liquid lubricant resulting from fluctuations in the meniscus levels under the influence of, for example, external interfering forces.

A further embodiment of a dynamic groove bearing according to the invention is characterized in that the bearing surface of the outer bearing part is provided with the pattern of grooves, while the first lateral surface of the annular recess adjoins said pattern of grooves. In this further embodiment of the dynamic groove bearing according to the invention, the liquid lubricant flowing from the annular recess adjacent the first lateral surface of this recess at comparatively high speeds is immediately subjected to the pumping action of the pattern of grooves, so that the liquid lubricant is effectively returned into the bearing gap. In addition, the meniscus reaches a comparatively low level adjacent the second lateral surface of the annular recess because the meniscus only reaches a level corresponding to a position of a bottom of the grooves of the pattern adjacent the first lateral surface of the recess.

A yet further embodiment of a dynamic groove bearing according to the invention is characterized in that the second lateral surface of the annular recess is provided with a coating which repels the liquid lubricant. The contact angle of the meniscus against the second lateral surface of the annular recess has a comparatively high value as a result of said coating, so that a convex meniscus arises in the recess which covers the first lateral surface of the annular recess entirely. The difference in level between the meniscus adjacent the first lateral surface and the meniscus adjacent the second lateral surface is further increased in this manner, so that the reliability of the annular recess is further improved.

A special embodiment of a dynamic groove bearing according to the invention is characterized in that the inner bearing part has a conical surface which is arranged opposite the second lateral surface of the annular recess and which encloses an obtuse angle $\beta_3$ with the bearing surface of the inner bearing part, which obtuse angle $\beta_3$ is smaller than the obtuse angle $\beta_2$. The use of said conical surface with the obtuse angle $\beta_3$ results in an annular chamber present between the second lateral surface of the annular recess and the conical surface and widening out as seen from the bearing gap. When the dynamic groove bearing is stationary, part of the liquid lubricant will flow from the bearing gap. This liquid lubricant will form a meniscus in said annular chamber between the second lateral surface of the annular recess and said conical surface of the inner bearing part, this liquid lubricant being subject to a capillary force directed towards the bearing gap as a result of the widening shape of the annular chamber. This capillary force prevents a leakage of liquid lubricant from the dynamic groove bearing also when this dynamic groove bearing is stationary.

A further embodiment of a dynamic groove bearing according to the invention is characterized in that the conical surface extends in a direction away from the bearing gap to beyond the second lateral surface of the annular recess. In this further embodiment, the widening annular chamber is comparatively large, so that a comparatively large quantity of liquid lubricant is retained in the annular chamber under the influence of the capillary force while the dynamic groove bearing is stationary.

A yet further embodiment of a dynamic groove bearing according to the invention is characterized in that the conical surface is a lateral surface of a further annular recess which is provided in the bearing surface of the inner bearing part. The use of the further annular recess means that only a comparatively small quantity of material need be removed from the inner bearing part in the manufacture thereof for providing the conical surface in the bearing surface of the inner bearing part.

According to the invention, an electric motor of the kind mentioned in the opening section is characterized in that the dynamic groove bearing used therein is a dynamic groove bearing according to the invention. The favourable properties of the dynamic groove bearing according to the invention as described above are used to particular advantage in the electric motor because pollution of the electric motor through leakage of liquid lubricant from the dynamic groove bearing at comparatively high speeds of the electric motor is prevented.

According to the invention, a data storage unit of the kind mentioned in the opening section is characterized in that the electric motor used therein is an electric motor according to the invention. The favourable properties of the electric motor according to the invention and of the dynamic groove bearing used therein are used to particular advantage in the data storage unit because pollution of the data storage unit and of the information disc used therein caused by leakage of liquid lubricant from the dynamic groove bearing of the electric motor at comparatively high speeds of the electric motor is prevented.

BRIEF DESCRIPTION OF THE INVENTION

The invention will be explained in more detail below with reference to the drawing, in which FIG. 1a shows an electric motor according to the invention provided with a first embodiment of a dynamic groove bearing according to the invention, FIG. 1b shows in detail an annular recess of the dynamic groove bearing of FIG. 1a while the motor is rotating, FIG. 2a shows an electric motor according to the invention provided with a second embodiment of a dynamic groove bearing according to the invention, FIG. 2b shows in detail an annular recess and a further annular recess of the dynamic groove bearing of FIG. 2a while the motor is stationary, FIG. 3a shows an electric motor according to the invention provided with a third embodiment of a dynamic groove bearing according to the invention, FIG. 3b shows in detail an annular recess and a further annular recess of the dynamic groove bearing of FIG. 3a while the motor is rotating, FIG. 4 is a diagrammatic plan view of a data storage unit with an electric motor and a dynamic groove bearing according to the invention, and FIG. 5 is a side elevation of the data storage unit of FIG. 4.

DESCRIPTION OF THE PREFERRED EMBODIMENT

Figure 1A:
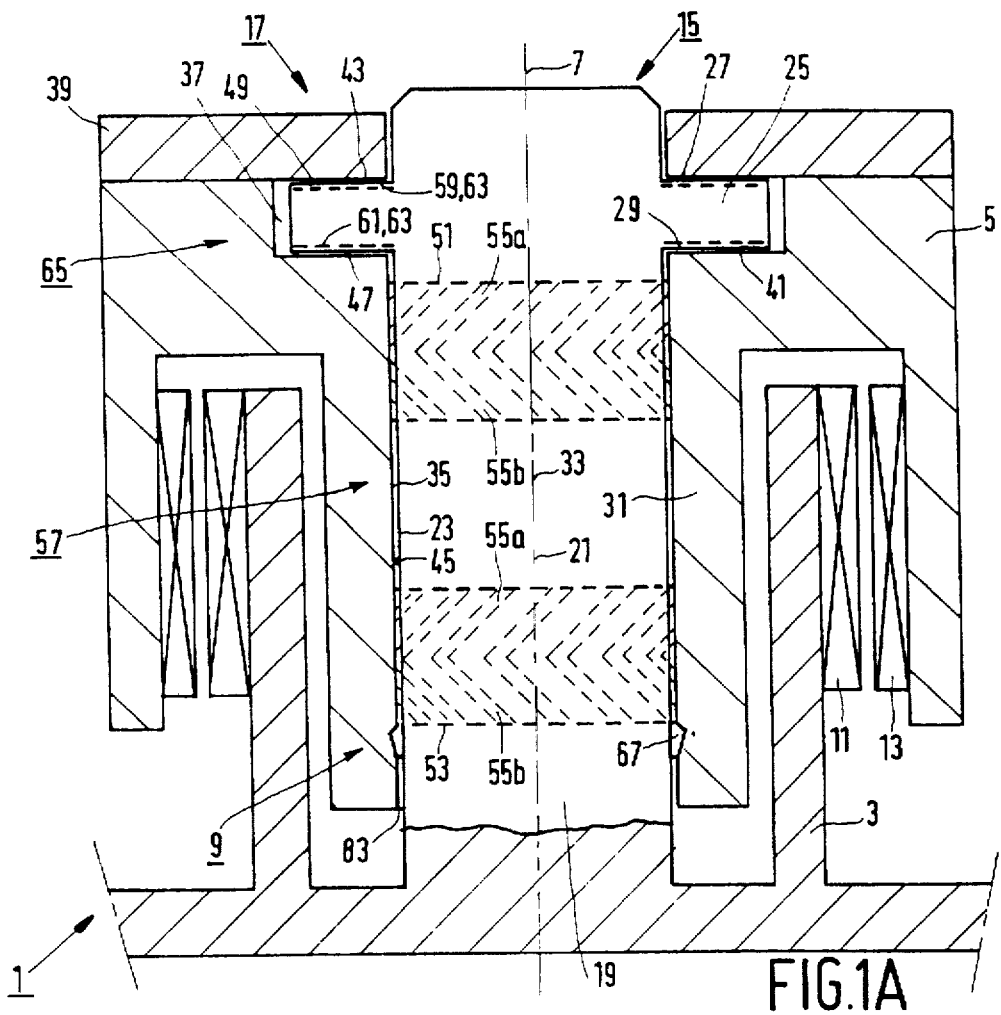
Figure 2A:
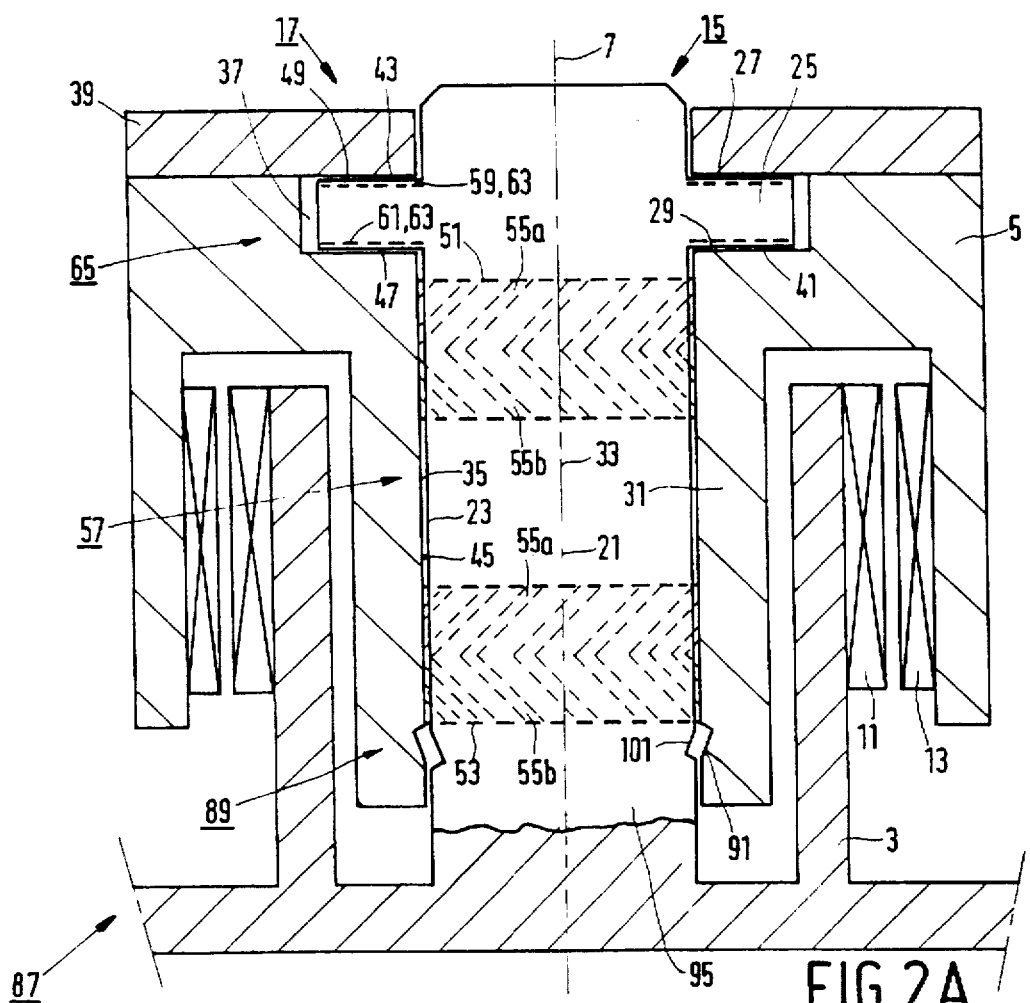
Figure 3A:
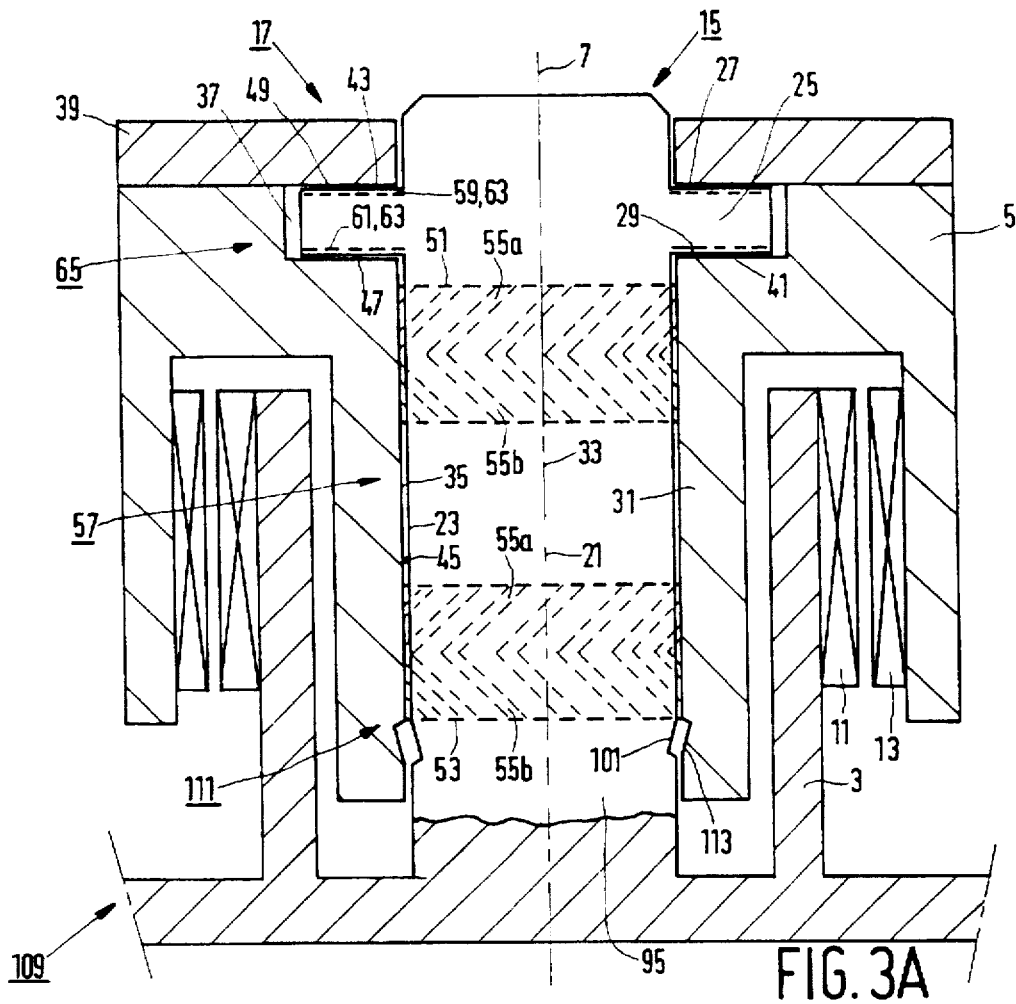

In FIGS. 1a, 2a, and 3a, corresponding parts of the electric motors shown in these Figures and of the respective first, second, and third embodiments of the dynamic groove bearing according to the invention used therein have been given the same reference numerals.

The electric motor 1 shown in FIG. 1a comprises a stator 3 and a rotor 5 which is journaled with rotation possibility about an axis of rotation 7 relative to the stator 3 by means of a first embodiment of a dynamic groove bearing 9 according to the invention. The stator 3 comprises an electric coil 11 which is depicted only diagrammatically only in FIG. 1a, while the rotor 5 comprises a permanent magnet 13 which is to cooperate with the electric coil 11 and which also is only depicted diagrammatically only in FIG. 1a.

As FIG. 1a further shows, the dynamic groove bearing 9 has an inner bearing part 15 and an outer bearing part 17 which is rotatable about the axis of rotation 7 relative to the inner bearing part 15. The inner bearing part 15 is fastened to the stator 3 of the electric motor 1, while the outer bearing part 17 is fastened to the rotor 5 of the electric motor 1. The inner bearing part 15 comprises a shaft 19 which is fixedly arranged relative to the stator 3 and which has a centerline 21 which coincides with the axis of rotation 7. The shaft 19 is provided with a smooth circular-cylindrical bearing surface 23 which is concentric with the centerline 21. The inner bearing part 15 further comprises an annular bearing plate 25 provided with annular bearing surfaces 27 and 29 extending perpendicular to the centerline 21. The outer bearing part 17 comprises a bearing bush 31 fastened to the rotor 5 and having a centerline 33 which during operation coincides substantially with the centerline 21 of the shaft 19. The bearing bush 31 has a circular-cylindrical bearing surface 35 which is provided on an inside concentrically with the centerline 33 and which is to cooperate with the bearing surface 23 of the shaft 19. The outer bearing part 17 further comprises an annular bearing chamber 37 in which the bearing plate 25 of the inner bearing part 15 is present. The bearing chamber 37 is closed by means of an annular closing plate 39 of the outer bearing part 17. The bearing chamber 37 is provided with a smooth, annular bearing surface 41 which extends perpendicular to the centerline 33 and which is to cooperate with the annular bearing surface 29 of the bearing plate 25, while the closing plate 39 is provided with a smooth annular bearing surface 43 which extends perpendicular to the centerline 33 and which is to cooperate with the annular bearing surface 27 of the bearing plate 25. A bearing gap 45 is present between the cooperating bearing surfaces 23 and 35, a bearing gap 47 between the cooperating bearing surfaces 29 and 41, and a bearing gap 49 between the cooperating bearing surfaces 27 and 43, a liquid lubricant being present in said bearing gaps 45, 47 and 49 during operation such as, for example, a lubrication oil or grease.

As FIG. 1a further shows, a first pattern of grooves 51 and a second pattern of grooves 53 are provided in the bearing surface 35 of the bearing bush 31 at an axial distance from one another, each pattern comprising a number of consecutive pairs of grooves 55a, 55b arranged in a V-shape and with regular interspacings. The patterns of grooves 51 and 53 in combination with the smooth bearing surface 23 of the shaft 19 form a radial dynamic groove bearing 57, in which a stabilizing pressure build-up takes place of the liquid lubricant present in the grooves 55a, 55b under the influence of a pumping action of the grooves 55a, 55b during rotation of the bearing bush 31 about the shaft 19, so that the outer bearing part 17 is supported perpendicularly to the axis of rotation 7 relative to the inner bearing part 15. The annular bearing surfaces 27 and 29 of the bearing plate 25 are also provided with respective groove patterns 59 and 61. The groove patterns 59 and 61, visible in side elevation only in FIG. 1a, again each comprise a number of consecutive pairs of grooves 63 arranged in a V-shape with regular interspacings. The patterns of grooves 59 and 61 in combination with the smooth bearing surface 43 and the smooth bearing surface 41, respectively, of the outer bearing part 17 form an axial dynamic groove bearing 65 in which a stabilizing pressure build-up takes place of the liquid lubricant present in the grooves 63 under the influence of a pumping action of the grooves 63 during rotation of the outer bearing part 17 about the inner bearing part 15, so that the outer bearing part 17 is supported parallel to the axis of rotation 7 relative to the inner bearing part 15.

Figure 1B:
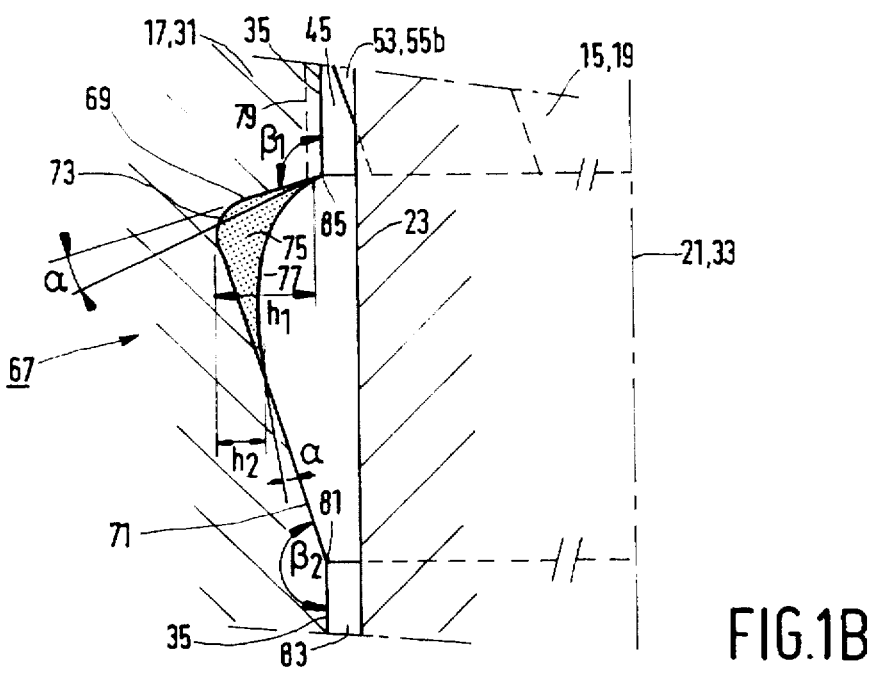

As FIG. 1a further shows, the dynamic groove bearing 9 of the electric motor 1 has an annular recess 67 which is provided in the bearing surface 35 of the outer bearing part 17 and which bounds the bearing gap 45 between the cooperating bearing surfaces 23 and 35. As will be explained below, the annular recess 67 prevents liquid lubricant present in the bearing gap 45 from leaking from the dynamic groove bearing 9. The annular recess 67 is shown in detail in FIG. 1b. As FIG. 1b shows, the annular recess 67 is provided at a side facing the bearing gap 45 with a first lateral surface 69 which adjoins the bearing surface 35 of the outer bearing part 17 and which encloses an obtuse angle $\beta_1$ with the bearing surface 35 of the outer bearing part 17. At a side remote from the bearing gap 45, the annular recess 67 is provided with a second lateral surface 71 which also adjoins the bearing surface 35 of the outer bearing part 17 and which encloses an angle $\beta_2$, also obtuse, with the bearing surface 35 of the outer bearing part 17. As is visible in FIG. 1b, the obtuse angle $\beta_1$ is smaller than the obtuse angle $\beta_2$, that the first lateral surface 69 of the recess 67 with respect to bearing surface 35 is steeper than the second lateral surface 71 of the recess 67. As FIG. 1b further shows, the lateral surfaces 69 and 71 of the recess 67 merge into a rounded bottom 73 of the recess 67. The first lateral surface 69 of the recess 67 adjoins the pattern of grooves 53, the grooves 55b of said pattern 53 issuing into the annular recess 67.

The annular recess 67 operates as follows for preventing leakage of liquid lubricant from the dynamic groove bearing 9. As is usual and known for dynamic groove bearings, leakage of liquid lubricant present in the bearing gap 45 occurs during operation above a critical speed of the dynamic groove bearing 9. Said critical speed is determined by inter alia a height of the bearing gap 45 and a viscosity and surface tension of the liquid lubricant. The liquid lubricant leaking from the bearing gap 45 during operation is carried along in rotation by the outer bearing part 17 under the influence of frictional forces between the liquid lubricant and the outer bearing part 17. This means that the liquid lubricant is also subject to a centrifugal force, under the influence of which the liquid lubricant caught therein and is retained in the annular recess 67. As FIG. 1b shows, the liquid lubricant 75 which has leaked from the bearing gap 45 has a meniscus 77 in the annular recess 67 which lies against the first lateral surface 69 and the second lateral surface 71 of the annular recess 67 at a so-called contact angle a. The contact angle a has a value which is determined by a composition of the liquid lubricant 75, a composition of a material from which the bearing bush 31 was manufactured and in which the annular recess 67 is provided, and a speed of the electric motor 1 and the dynamic groove bearing 9. In the first embodiment of the dynamic groove bearing 9 shown in FIGS. 1a and 1b, the lateral surfaces 69 and 71 of the annular recess 67 are made of the same material, so that the contact angle a between the meniscus 77 and the first lateral surface 69 is approximately equal to the contact angle $\alpha$ between the meniscus 77 and the second lateral surface 71. Since the obtuse angle $\beta_1$ of the first lateral surface 69 is smaller than the obtuse angle $\beta_2$ of the second lateral surface 71, i.e. the first lateral surface 69 is steeper than the second lateral surface 71, the meniscus 77 will have a level $h_1$ above the bottom 73 of the recess 67 at the first lateral surface 69 for achieving the contact angle a which is higher than a level $h_2$ of the meniscus 77 at the second lateral surface 71 for achieving the contact angle α. Said levels $h_1$ and $h_2$ of the meniscus 77 will increase until a situation depicted in FIG. 1b is reached if the quantity of liquid lubricant 75 in the annular recess 77 increases as a result of continuing leakage of liquid lubricant from the bearing gap 45 during operation at comparatively high speeds of the dynamic groove bearing 9. In this situation, the meniscus 77 reaches up to a bottom 79 of the grooves 55b of the pattern of grooves 53 adjacent the first lateral surface 69 of the recess 67. If the quantity of liquid lubricant 75 in the recess 67 increases still further in this situation, the liquid lubricant 75 will flow into the grooves 55b of the pattern of grooves 53 adjacent the first lateral surface 69, and the liquid lubricant entering the grooves 55b of the pattern of grooves 53 will be returned to the bearing gap 45 under the influence of the pumping action of the grooves 55b. A level of the liquid lubricant 75 in the annular recess 67 as shown in FIG. 1b is not exceeded in this manner. The liquid lubricant 75 present in the recess 67 will not overflow an edge 81 of the recess 67 remote from the bearing gap 45 because the height $h_2$ of the meniscus 77 adjacent the second lateral surface 71 of the recess 67 is smaller than the height $h_1$ of the meniscus 77 adjacent the first lateral surface 69 of the recess 67, so that leakage of liquid lubricant along an end 83 of the dynamic groove bearing 9 shown in FIG. 1a is prevented at said comparatively high speeds of the dynamic groove bearing 9.

The difference between said heights $h_1$ and $h_2$ of the meniscus 77 is determined by a difference between the values of the obtuse angles $\beta_1$ and $\beta_2$. Said heights $h_1$ and $h_2$ fluctuate as a result of, for example, external interfering forces which are exerted on the dynamic groove bearing 9. It is noted that the difference between the levels $h_1$ and $h_2$ of the meniscus 77 is sufficient for preventing leakage of liquid lubricant from the dynamic groove bearing 9 resulting from fluctuations in the levels $h_1$ and $h_2$ when the obtuse angle $\beta_1$ is smaller than approximately 135° and the obtuse angle $\beta_2$ is greater than approximately 145°. In the first embodiment of the dynamic groove bearing 9 shown in FIG. 1b, the angle $\beta_1$ is approximately 120° and the angle $\beta_2$ approximately 160°. It is noted, however, that the annular recess 67 will in general prevent leakage of liquid lubricant from the dynamic groove bearing 9 when the angle $\beta_1$ is smaller than the angle $\beta_2$, in accordance with the operation of the recess 67 as described above.

The meniscus 77 only reaches a level which corresponds approximately to a position of the bottom 79 of the grooves 55b adjacent the first lateral surface 69 of the recess 67 because the pattern of grooves 53 adjoins the annular recess 67 and the grooves 55b of the pattern of grooves 53 issue into the recess 67. The level $h_2$ of the meniscus 77 adjacent the second lateral surface 71 of the recess 67 is comparatively low as a result of this, so that the recess 67 has a very reliable operation. It is noted, however, that the invention is also applicable when the pattern of grooves 53 and the annular recess 67 are at an axial distance from one another. In such an alternative embodiment of a dynamic groove bearing according to the invention, the meniscus 77 reaches a level adjacent the first lateral surface 69 of the recess 67 which corresponds to a position of an edge 85 of the recess 67 facing the bearing gap 45. If the meniscus 77 exceeds said edge 85, liquid lubricant flowing over from the recess 67 is returned to the bearing gap 45 under the influence of a capillary force of the bearing gap 45. Given a sufficient difference between the angles $\beta_1$ and $\beta_2$, however, it is achieved also in this alternative embodiment that the meniscus 77 retains a sufficient distance to the edge 81 of the recess remote from the bearing gap 45 adjacent the second lateral surface 71 of the recess 67, so that leakage of liquid lubricant from the groove bearing is prevented.

In the electric motor 87 shown in FIG. 2a, the rotor 5 is journaled with rotation possibility about the axis of rotation 7 relative to the stator 3 by means of a second embodiment of a dynamic groove bearing 89 according to the invention. The dynamic groove bearing 89 of the electric motor 87 again comprises an annular recess 91 provided in the bearing surface 35 of the outer bearing part 17 and bounding the bearing gap 45 between the cooperating bearing surfaces 23 and 35. The annular recess 91 is shown in detail in FIG. 2b. Like the annular recess 67 of the dynamic groove bearing 9, the annular recess 91 of the dynamic groove bearing 89 is asymmetrical, having at a side thereof facing the bearing gap 45 with a first lateral surface 69 which adjoins the bearing surface 35 of the outer bearing part 17 and encloses an obtuse angle $\beta_1$ with the bearing surface 35 of the outer bearing part 17, and having at a side thereof remote from the bearing gap 45 a second lateral surface 71 which again adjoins the bearing surface 35 of the outer bearing part 17 and also encloses an obtuse angle $\beta_2$ with the bearing surface 35 of the outer bearing part 17, the angle $\beta_1$ being smaller than the angle $\beta_2$. As FIG. 2b further shows, the lateral surfaces 69 and 71 of the recess 91 merge into a flat, circular-cylindrical bottom 93 of the recess 91.

Figure 2B:
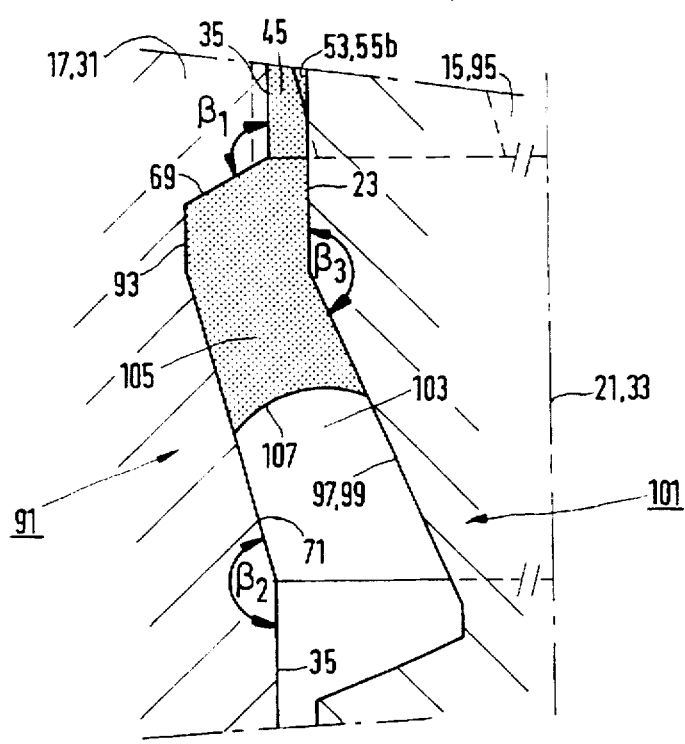

As FIG. 2b further shows, the inner bearing part 15 of the dynamic groove bearing 89 has a shaft 95 which is provided with the smooth, circular-cylindrical bearing surface 23. A conical surface 97 is provided in the bearing surface 23 of the shaft 95, forming a lateral surface 99 of a further annular recess 101 provided in the bearing surface 23 of the shaft 95. As FIG. 2b shows, the lateral surface 99 is present at a side of the further annular recess 101 which faces the bearing gap 45. The conical surface 97 is arranged opposite the second lateral surface 71 of the annular recess 91 of the outer bearing part 17 and encloses an obtuse angle $\beta_3$ with the bearing surface 23 of the inner bearing part 15. The obtuse angle $\beta_3$ of the conical surface 97 is smaller than the obtuse angle $\beta_2$ of the second lateral surface 71 of the annular recess 91, so that an annular chamber 103 is present between the second lateral surface 71 of the annular recess 91 and the conical surface 97, which chamber widens in a direction away from the bearing gap 45. As FIG. 2b further shows, the conical surface 97 extends in axial direction, seen from the bearing gap 45, to beyond the second lateral surface 71 of the annular recess 91.

The operation of the annular recess 91 in the outer bearing part 17 for the prevention of leakage of liquid lubricant from the dynamic groove bearing 89 during rotation of the electric motor 87 and the dynamic groove bearing 89 used therein corresponds to the operation of the annular recess 67 of the dynamic groove bearing 9, the annular recess 91 preventing leakage of liquid lubricant from the dynamic groove bearing 89 also at comparatively high speeds of the electric motor 87. FIG. 2b shows the annular recess 91 in the outer bearing part 17 and the further annular recess 101 in the inner bearing part 15 while the electric motor 87 is stationary, as well as the dynamic groove bearing 89, part of the liquid lubricant 105 flowing from the bearing gap 45 under the influence of capillary forces. As FIG. 2b shows, liquid lubricant 105 which escaped from the bearing gap 45 in the stationary state forms a meniscus 107 in the annular chamber 103 between the second lateral surface 71 of the annular recess 91 in the outer bearing part 17 and the conical surface 97 of the inner bearing part 15. Owing to the divergence of the annular chamber 103 as seen from the bearing gap 45, the liquid lubricant 105 in the annular chamber 103 is subject to a capillary force directed towards the bearing gap 45. Said capillary force keeps the liquid lubricant 105 in the annular chamber 103 while the electric motor 87 and the dynamic groove bearing 89 are stationary, so that leakage of liquid lubricant from the dynamic groove bearing 89 is prevented also while the electric motor 87 is stationary. The annular chamber 103 has a volume which is as large as possible because the conical surface 97 extends in axial direction from the bearing gap 45 to beyond the second lateral surface 71 of the annular recess 91 in the outer bearing part 17, so that a comparatively large quantity of liquid lubricant can be retained in the annular chamber 103 under the influence of the capillary force while the electric motor 87 is stationary. Since the conical surface 97 is the lateral surface 99 of the further annular recess 101 in the inner bearing part 15, only a comparatively small quantity of material need be removed from the inner bearing part 15 during its manufacture for providing the conical surface 97 in the bearing surface 23 of the inner bearing part 15. It is noted that the conical surface 97 may alternatively be constructed as a narrowed portion of the shaft 95, in which case the shaft 95 is given an external diameter smaller than an external diameter of the bearing surface 23 of the inner bearing part 15 at a side of the conical surface 97 remote from the bearing gap 45. A comparatively large quantity of material, however, must be removed from the shaft 95 of the inner bearing part 15 for providing such a narrowed portion. It is further noted that the further annular recess 101 may alternatively extend in axial direction to beyond an end of the bearing bush 31. A height of an annular gap between the end of the bearing bush 31 and the shaft 95 is increased thereby, which prevents said annular gap from retaining a quantity of liquid lubricant under the influence of a capillary force of said annular gap.

Figure 3B:
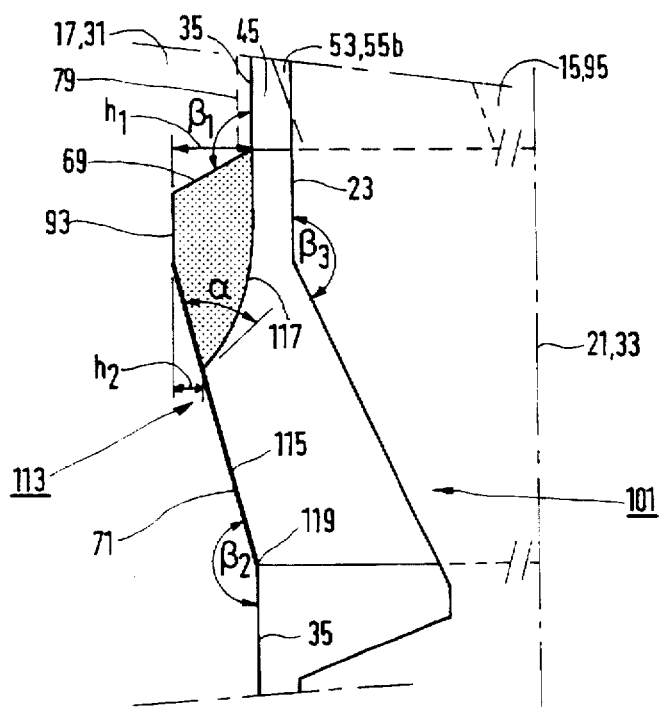

In the electric motor 109 shown in FIG. 3a, the rotor 5 is journaled with rotation possibility about the axis of rotation 7 relative to the stator 3 by means of a third embodiment of a dynamic groove bearing 111 according to the invention. The bearing surface 35 of the outer bearing part 17 of the dynamic groove bearing 111 is provided with an annular recess 113 whose shape corresponds to a shape of the annular recess 91 of the outer bearing part 17 of the dynamic groove bearing 89. The bearing surface 23 of the inner bearing part 15 of the dynamic groove bearing 111 is provided with a further annular recess 101 which corresponds to the further annular recess 101 of the inner bearing part 15 of the dynamic groove bearing 89. The third embodiment of the dynamic groove bearing 111 differs from the second embodiment of the dynamic groove bearing 89 in that the second lateral surface 71 of the annular recess 113 of the outer bearing part 17 is provided with a lubricant-repelling coating 115 such as, for example, a fluorine-carbon polymer. In this third embodiment of the dynamic groove bearing 111, the liquid lubricant leaking from the bearing gap 45 during operation is again caught in the annular recess 113 and retained there under the influence of centrifugal forces acting on the liquid lubricant. Since the second lateral surface 71 of the annular recess 113 is provided with said coating 115, the liquid lubricant has a comparatively great contact angle a with the second lateral surface 71 in the annular recess 113 so that the liquid lubricant has a convex meniscus 117, as shown in FIG. 3b, in the annular recess 113. The contact angle a of the meniscus 117 adjacent the second lateral surface 71 is comparatively great, and in addition the obtuse angle $\beta_2$ of the second lateral surface 71 is greater than the obtuse angle $\beta_1$ of the first lateral surface 69, which has the result that the meniscus 117 adjacent the second lateral surface 71 has a level $h_2$ above the bottom 93 of the recess 113 for achieving the comparatively great contact angle α which is low in comparison with a level $h_1$ of the meniscus 117 adjacent the first lateral surface 69. Said levels $h_1$ and $h_2$ of the meniscus 117 rise until a situation shown in FIG. 3b is reached when the quantity of liquid lubricant in the annular recess 113 increases as a result of a continuing leakage of liquid lubricant from the bearing gap 45 during operation at comparatively high speeds of the dynamic groove bearing 111. In this situation, the meniscus 117 reaches the level of the bottom 79 of the grooves 55b of the pattern of grooves 53 adjacent the first lateral surface 69 of the recess 113, so that the liquid lubricant flows from the recess 113 into the grooves 55b and is returned to the bearing gap 45 by the pumping action of the grooves 55b. The liquid lubricant adjacent the second lateral surface 71 in the recess 113 retains a comparatively wide distance to an edge 119 of the recess 113 remote from the bearing gap 45 owing to the comparatively great difference between the levels $h_1$ and $h_2$ of the convex meniscus 117. The use of said coating 115 thus enhances the reliability of the annular recess 113.

It is noted that a convex meniscus in the annular recess 67, 91, 113 of the outer bearing part 17 may alternatively be achieved without a lubricant-repelling coating 115 on the second lateral surface 71 of the recess 67, 91, 113 being provided. A convex meniscus will also arise in the recess 67, 91, 113 when the obtuse angle $\beta_2$ of the second lateral surface 71 is greater than a difference between an angle of 180° and a contact angle α of the meniscus in the recess 67, 91, 113 adjacent the non-coated second lateral surface 71, whereby the difference between the levels $h_1$ and $h_2$ of the meniscus is increased. Since said contact angle α of the meniscus with the non-coated second lateral surface 71 is comparatively small, however, the obtuse angle $\beta_2$ should have a value of almost 180°, so that the second lateral surface 71 of the recess 67, 91, 113 must have a comparatively great axial length.

It is further noted that a suitable choice of the material of the coating 115 leads to a meniscus in the annular recess 113 which is more convex than the meniscus 117 shown in FIG. 3b. As the quantity of liquid lubricant in the annular recess 113 increases, said comparatively convex meniscus will make contact first with the bearing surface 23 of the inner bearing part 15. As a result, liquid lubricant present in the recess 113 is returned to the bearing gap 45 both by a capillary force of the bearing gap 45 and by the pumping action of the grooves 55b.

Figure 4:
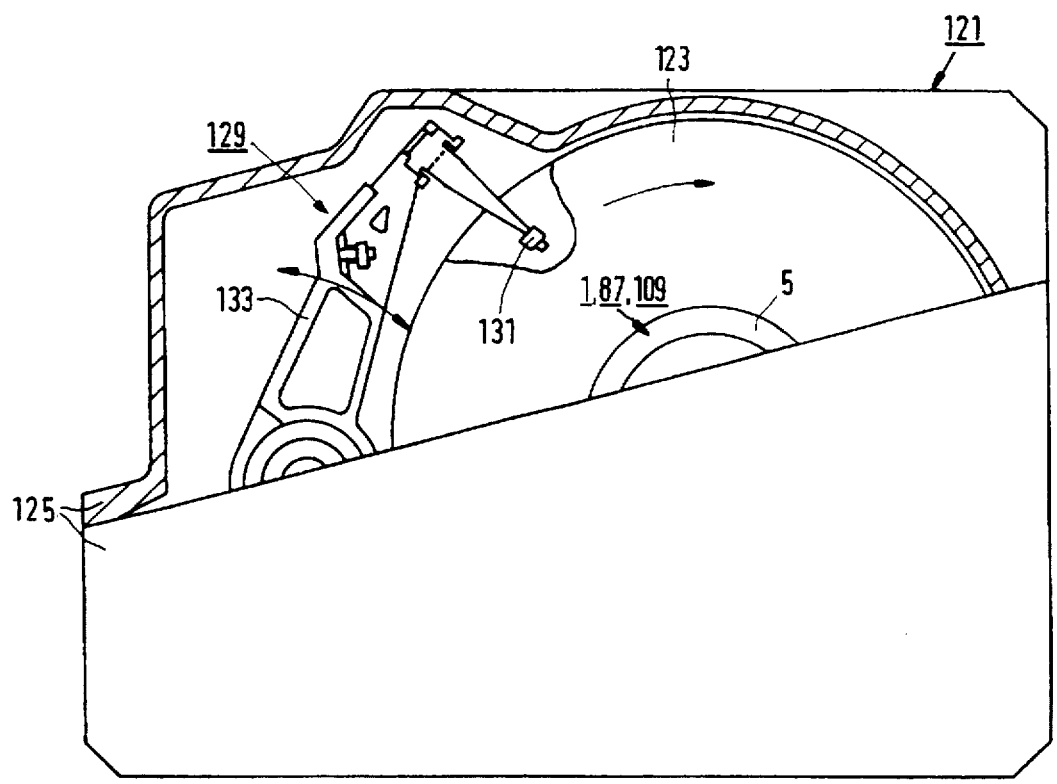
Figure 5:
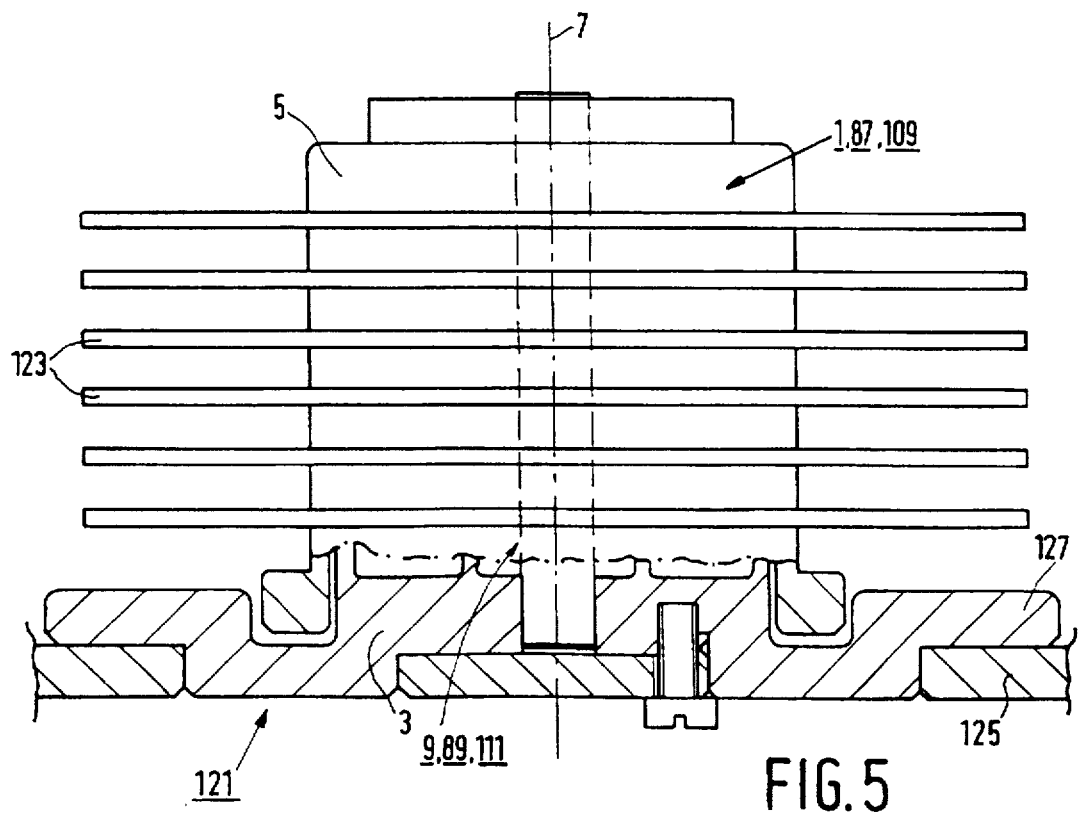

FIGS. 4 and 5 diagrammatically show a data storage unit 121 provided with an electric motor 1, 87, 109 comprising a dynamic groove bearing 9, 89, 111 according to the invention. The data storage unit 121 comprises a number of parallel information discs 123 which can be rotated about the axis of rotation 7 of the electric motor 1, 87, 109 in a housing 125 by means of said electric motor 1, 87, 109. The information discs 123 are, for example, so-called hard disks for use in a computer. As FIG. 5 shows, the information discs 123 are for this purpose fastened at regular axial interspacings to the rotor 5 of the electric motor 1, 87, 109, while the stator 3 of the electric motor 1, 87, 109 is fastened to a bottom plate 127 of the housing 125. The data storage unit 121 is further provided with a scanning unit 129 with a number of magnetic heads 131 for cooperation with the information discs 123. The magnetic heads 131 are fastened to an arm 133 which is pivotable relative to the housing 125 and the information discs 123 and which has an individual magnetic head 131 for each information disc 123. It is noted that only one of the magnetic heads 131 is visible in FIG. 4, while the arm 133 and the magnetic heads 131 are not shown in FIG. 5 for simplicity's sake. When the rotor 5 with the information discs 123 is rotated about the axis of rotation 7 by means of the electric motor 1, 87, 109, and the magnetic heads 131 are positioned relative to the rotating information discs 123 by means of the arm 133, the information discs 123 are read or written by the magnetic heads 131.

The electric motor 1, 87, 109 should rotate at a comparatively high speed in order to limit a time required for reading or writing the information discs 123. The electric motor 1, 87, 109 with the dynamic groove bearing 9, 89, 111 used therein is particularly suitable for use in the data storage unit 121 because leakage of liquid lubricant at such high speeds is prevented in the dynamic groove bearing 9, 89, 111 used in the electric motor 1, 87, 109. It is indeed prevented in this manner that the information discs 123 and the magnetic heads 131 are polluted by leakage of liquid lubricant.. Such pollution of the information discs 123 and the magnetic heads 131 usually causes a disturbance in the operation of the data storage unit 121 and the computer used in combination with it. The leakproof dynamic groove bearings 9, 89, 111 in addition provide for a comparatively long, trouble-free operation of the electric motor 1, 87, 109.

The dynamic groove bearings 9, 89, 111 described above each comprise a radial dynamic groove bearing 57 with cooperating circular-cylindrical bearing surfaces 23, 35, and an axial dynamic groove bearing 65 with cooperating annular bearing surfaces 27, 43 and 29, 41. It is noted that the invention is also applicable to dynamic groove bearings in which the cooperating bearing surfaces are of a different shape such as, for example, dynamic groove bearings with conical or spherical bearing surfaces which have a radial as well as an axial bearing function.

It is noted that the bearing surface 23 of the inner bearing part 15 and the bearing surface 35 of the outer bearing part 17 in the dynamic groove bearing 9, 89, 111 described above have a diameter adjacent the relevant annular recess 67, 91, 113 which corresponds to a diameter of the bearing surface 23 of the inner bearing part 15 adjacent the pattern of grooves 51, 53 and a diameter of the bearing surface 35 of the outer bearing part 17 adjacent the pattern of grooves 51, 53, respectively. According to the invention, the bearing surfaces of the inner bearing part and outer bearing part may alternatively have a diameter adjacent the annular recess which differs from the diameter of said bearing surfaces adjacent the pattern of grooves. Thus, for example, the shaft 19 of the inner bearing part 15 of the dynamic groove bearing 9 shown in FIG. 1a may be given a diameter above the bearing plate 25 which, for example, is greater than the diameter of the shaft adjacent the patterns of grooves 51, 53, in which case the closing plate 39 is provided with an annular recess according to the invention for preventing leakage of liquid lubricant along the closing plate 39.

In the dynamic groove bearings 9, 89, 111 described above, the bearing surface 35 of the outer bearing part 17 has the same diameter on either side of the annular recess 67, 91, 113. It is noted that the bearing surface 35 may alternatively have different diameters on either side of the annular recess 67, 91, 113 according to the invention. Thus, for example, the bearing surface 35 may have a diameter at a side of the recess 67, 91, 113 remote from the bearing gap 45 which is greater than a diameter of the bearing surface 35 at a side of the recess 67, 91, 113 facing the bearing gap 45. Given a sufficient difference between the angles $\beta_1$ and $\beta_2$, it is achieved also in such an alternative embodiment of a dynamic groove bearing according to the invention that the meniscus 77, 117 present in the recess 67, 91, 113 does not rise above the edge 81, 119 of the recess 67, 91, 113 remote from the bearing gap 45.

As was described above, the annular recess 67, 91, 113 is provided adjacent an end of the bearing bush 31 or in the closing plate 39, whereby the annular recess 67, 91, 113 forms the boundary of the bearing gap 45 between the cooperating bearing surfaces 23, 35. According to the invention, however, an annular recess may alternatively be provided in the dynamic groove bearings 9, 89, 111 described above in the bearing surface 35 of the outer bearing part 17 between the radial dynamic groove bearing 57 and the axial dynamic groove bearing 65, for example immediately above the pattern of grooves 51 as seen in FIGS. 1a, 2a and 3a. Such an annular recess between the radial dynamic groove bearing 57 and the axial dynamic groove bearing 65 prevents leakage of liquid lubricant from the radial dynamic groove bearing 57 to the axial dynamic groove bearing 65 and vice versa, so that a previously made distribution of the liquid lubricant between the radial dynamic groove bearing 57 and the axial dynamic groove bearing 65 is maintained as much as possible.

It is further noted that the annular recess 67, 91, 113 according to the invention is characterized by the obtuse angles $\beta_1$ and $\beta_2$ of the lateral surfaces 69 and 71 of the recess 67, 91, 113 which adjoin the bearing surface 35 of the outer bearing part 17. The operation of the annular recess 67, 91, 113 is not determined by a shape of the bottom 73, 93 of the recess 67, 91, 113 arranged between the lateral surfaces 69 and 71. According to the invention, the annular recess 67, 91, 113 in the outer bearing part 17 may be given a bottom having a shape other than the rounded bottom 73 or the flat bottom 93, for example a V-shaped bottom merging into the lateral surfaces 69 and 71.

It is further noted that the dynamic groove bearing 9, 89, 111 may be used in devices other than a data storage unit 121 as described above, for example, in an electric motor of a rotatable scanning unit in a magnetic tape appliance. Furthermore, the dynamic groove bearing 9, 89, 111 may be used in a different type of motor instead of in an electric motor, for example in a pneumatic motor.

It is finally noted that the invention is also applicable to an electric motor for a data storage unit which comprises only one rotatable information disc. The dynamic groove bearing according to the invention is eminently suitable for miniaturization, so that such a data storage unit and the information disc used therein may have comparatively small dimensions.

We claim:

1. A dynamic groove bearing with an inner bearing part and an outer bearing part which is rotatable about the inner bearing part, which bearing parts are provided with cooperating bearing surfaces between which there is a bearing gap in which a liquid lubricant is present during operation, while the bearing surface of at least one of the bearing parts is provided with a pattern of grooves and the bearing surface of the outer bearing part is provided with an annular recess which bounds the bearing gap, characterized in that the annular recess is asymmetrical, having at a side thereof facing the bearing gap a first lateral surface which adjoins the bearing surface of the outer bearing part and encloses an obtuse angle $\beta_1$ with the bearing surface of the outer bearing part, while the annular recess at a side facing away from the bearing gap has a second lateral surface which adjoins the bearing surface of the outer bearing part and encloses an obtuse angle $\beta_2$ with the bearing surface of the outer bearing part, the obtuse angle $\beta_1$ being smaller than the obtuse angle $\beta_2$.

2. A dynamic groove bearing as claimed in claim 1, characterized in that the obtuse angle $\beta_1$ is smaller than 135°, while the obtuse angle $\beta_2$ is greater than 145°.

3. A dynamic groove bearing as claimed in claim 2, characterized in that the inner bearing part has a conical surface which is arranged opposite the second lateral surface of the annular recess and which conical surface encloses an obtuse angle $\beta_3$ with the bearing surface of the inner bearing part, and which obtuse angle $\beta_3$ is smaller than the obtuse angle $\beta_2$.

4. A dynamic groove bearing as claimed in claim 3, characterized in that the conical surface extends in a direction away from the bearing gap to beyond the second lateral surface of the annular recess.

5. A dynamic groove bearing as claimed in claim 1, characterized in that the bearing surface of the outer bearing part is provided with the pattern of grooves, while the first lateral surface of the annular recess adjoins said pattern of grooves.

6. A dynamic groove bearing as claimed in claim 1, characterized in that the second lateral surface of the annular recess is provided with a coating which repels the liquid lubricant.

7. A dynamic groove bearing as claimed in claim 1, characterized in that the inner bearing part has a conical surface which is arranged opposite the second lateral surface of the annular recess and which encloses an obtuse angle $\beta_3$ with the bearing surface of the inner bearing part, which obtuse angle $\beta_3$ is smaller than the obtuse angle $\beta_2$.

8. A dynamic groove bearing as claimed in claim 7, characterized in that the conical surface extends in a direction away from the bearing gap to beyond the second lateral surface of the annular recess.

9. A dynamic groove bearing as claimed in claim 8, characterized in that the conical surface is a lateral surface of a further annular recess which is provided in the bearing surface of the inner bearing part.

10. A dynamic groove bearing as claimed in claim 7, characterized in that the conical surface is a lateral surface of a further annular recess which is provided in the bearing surface of the inner bearing part.

11. An outer bearing part suitable for use in a dynamic groove bearing also having an inner bearing part, which bearing parts are provided with cooperating bearing surfaces between which there is a bearing gap in which a liquid lubricant is present during operation, wherein the bearing surface of at least one of the bearing parts is provided with a pattern of grooves, and the bearing surface of the outer bearing part is provided with an annular recess which bounds the bearing gap;

characterized in that:

the annular recess is asymmetrical having at a side thereof facing the bearing gap a first lateral surface which adjoins the bearing surface of the outer bearing part and encloses an obtuse angle $\beta_1$ with the bearing surface of the outer bearing part, the annular recess at a side facing away from the bearing gap has a second lateral surface which adjoins the bearing surface of the outer bearing part and encloses an obtuse angle $\beta_2$ with the bearing surface of the outer bearing part, and the obtuse angle $\beta_1$ is smaller than the obtuse angle $\beta_2$.

12. An inner bearing part suitable for use in a dynamic groove bearing also having an outer bearing part, which bearing parts are provided with cooperating bearing surfaces between which there is a bearing gap in which a liquid lubricant is present during operation, wherein the bearing surface of at least one of the bearing parts is provided with a pattern of grooves, the bearing surface of the outer bearing part is provided with an annular recess which bounds the bearing gap, the annular recess is asymmetrical, having at a side thereof facing the bearing gap a first lateral surface which adjoins the bearing surface of the outer bearing part and encloses an obtuse angle $\beta_1$ with the bearing surface of the outer bearing part, the annular recess at a side facing away from the bearing gap has a second lateral surface which adjoins the bearing surface of the outer bearing part and encloses an obtuse angle $\beta_2$ with the bearing surface of the outer bearing part, and the obtuse angle $\beta_1$ is smaller than the obtuse angle $\beta_2$;

characterized in that:

the inner bearing part has a conical surface which is arranged opposite the second lateral surface of the annular recess, said conical surface encloses an obtuse angle $\beta_3$ with the bearing surface of the inner bearing part, and the obtuse angle $\beta_3$ is smaller than the obtuse angle $\beta_2$.

13. An electric motor with a stator and a rotor which is journaled with rotation possibility relative to the stator by means of a dynamic groove bearing, the stator being fastened to an inner bearing part of the dynamic groove bearing and the rotor to an outer bearing part of the dynamic groove bearing, which bearing parts are provided with cooperating bearing surfaces between which there is a bearing gap in which a liquid lubricant is present during operation, wherein the bearing surface of at least one of the bearing parts is provided with a pattern of grooves, and the bearing surface of the outer bearing part is provided with an annular recess which bounds the bearing gap:

characterized in that:

the annular recess at a side facing the bearing gap is asymmetrical, having at a side thereof facing the bearing gap a first lateral surface which adjoins the bearing surface of the outer bearing part and encloses an obtuse angle $\beta_1$ with the bearing surface of the outer bearing part, the annular recess at a side facing away from the bearing gap has with a second lateral surface which adjoins the bearing surface of the outer bearing part and encloses an obtuse angle $\beta_2$ with the bearing surface of the outer bearing part, and the obtuse angle $\beta_1$ is smaller than the obtuse angle $\beta_2$.

14. An electric motor as claimed in claim 13, characterized in that the obtuse angle $\beta_1$ is smaller than 135°, while the obtuse angle $\beta_2$ is greater than 145°.

15. An electric motor as claimed in claim 13, characterized in that the inner bearing part has a conical surface which is arranged opposite the second lateral surface of the annular recess and which encloses an obtuse angle $\beta_3$ with the bearing surface of the inner bearing part, which obtuse angle $\beta_3$ is smaller than the obtuse angle $\beta_2$.

16. An electric motor as claimed in claim 15, characterized in that the conical surface is a lateral surface of a further annular recess which is provided in the bearing surface of the inner bearing part.

17. A data storage unit having a scanning unit for cooperating with an information disc, said disc being rotatable in a housing by means of an electric motor having a stator and a rotor which is journaled with rotation possibility relative to the stator by means of a dynamic groove bearing,

- the stator being fastened to an inner bearing part of the dynamic groove bearing,
- the rotor being fastened to an outer bearing part of the dynamic groove bearing,
- which bearing parts have cooperating bearing surfaces between which there is a bearing gap in which a liquid lubricant is present during operation,
- wherein the bearing surface of at least one of the bearing parts is provided with a pattern of grooves, and
- the bearing surface of the outer bearing part is provided with an annular recess which bounds the bearing gap;

characterized in that:

- the annular recess is asymmetrical, having at a side thereof facing the bearing gap a first lateral surface which adjoins the bearing surface of the outer bearing part and encloses an obtuse angle $\beta_1$ with the bearing surface of the outer bearing part,
- the annular recess at a side facing away from the bearing gap has a second lateral surface which adjoins the bearing surface of the outer bearing part and encloses an obtuse angle $\beta_2$ with the bearing surface of the outer bearing part, and
- the obtuse angle $\beta_1$ is smaller than the obtuse angle $\beta_2$.

18. A data storage unit as claimed in claim 17, characterized in that the bearing surface of the outer bearing part is provided with the pattern of grooves, while the first lateral surface of the annular recess adjoins said pattern of grooves.

19. A data storage unit as claimed in claim 17, characterized in that the second lateral surface of the annular recess is provided with a coating which repels the liquid lubricant.

20. A data storage unit as claimed in claim 17, characterized in that the inner bearing part has a conical surface which is arranged opposite the second lateral surface of the annular recess and which encloses an obtuse angle $\beta_3$ with the bearing surface of the inner bearing part, which obtuse angle $\beta_3$ is smaller than the obtuse angle $\beta_2$.

\* \* \* \* \*